United States Patent [19]

Pemberton

[11] 4,099,424
[45] Jul. 11, 1978

[54] CHAIN DRIVE

[76] Inventor: Robert E. Pemberton, R.R. #2, Box 123, Edinburg, Ind. 46124

[21] Appl. No.: 699,463

[22] Filed: Jun. 24, 1976

[51] Int. Cl.² .................. F16G 13/06; F16G 15/12
[52] U.S. Cl. .................................. 74/251 R; 74/252; 74/249; 74/243 R
[58] Field of Search .................. 74/251 R, 252, 249, 74/229, 243 R, 253 R

[56] References Cited

U.S. PATENT DOCUMENTS

| 565,049 | 8/1896 | Test | 74/251 |
|---|---|---|---|
| 679,578 | 7/1901 | Schildknecht | 74/251 R |
| 2,142,003 | 12/1938 | Morgelin | 74/251 R |
| 2,155,584 | 4/1939 | Bryant et al. | 74/251 R |
| 2,769,346 | 11/1956 | Flocke | 74/251 R |
| 3,231,069 | 1/1966 | Lanham | 74/251 R |
| 3,475,987 | 11/1969 | Henebry | 74/251 R |
| 3,811,334 | 5/1974 | Kuenzig et al. | 74/251 R |

Primary Examiner—Samuel Scott
Assistant Examiner—William R. Henderson

Attorney, Agent, or Firm—Jenkins, Coffey & Hyland

[57] ABSTRACT

A chain drive wherein a chain is formed from a plurality of one-piece roller links each having an enlarged diameter central roller with angularly upwardly and outwardly extending flanges at the opposed ends thereof. A reduced diameter journal projects outwardly from each end of each roller link, with connecting side plates being overlappingly received over the journals of adjacent roller links and retained by spring clips to form a continuous chain.

The central roller of each roller link has a width and diameter for mating reception within circularly recessed bottom lands between the teeth of a complementary formed sprocket wheel. The sprocket wheel also has angularly formed peripheral side walls for mating engagement with the roller link flanges. Further, the recessed sprocket wheel lands blend into flat sprocket tooth faces, or profiles, to allow smooth, substantially roll-free disengagement of the roller links from between the sprocket teeth upon sufficient sprocket wheel rotation.

19 Claims, 6 Drawing Figures

CHAIN DRIVE

BACKGROUND OF THE INVENTION

This invention relates to chain drives. More specifically, this invention relates to an improved roller drive chain construction and an improved sprocket wheel for use therewith.

A wide variety of chain drives are available throughout the prior art. Typically, chain drives comprise an axially extending journal pin having a cylindrically-shaped chain roller rotatably carried thereon. Adjacent pins are interconnected by side plates secured thereon as by rivets, cotter pins, etc. These chain drives thereby comprise a plurality of sliding and rolling parts exhibiting relatively high wear characteristics, particularly between the cylindrical rollers and the side plates and between the rollers and the journal pins. As a result, chain drives of this general construction must be frequently lubricated. This is not entirely satisfactory, however, because the lubricant tends to collect dirt and dust to further increase chain wear, and thereby increase the likelihood of chain breakage.

Another problem with prior art chain drives is that the cylindrical rollers carried on journal pins tend to deform under load conditions, and thereby bind with the axial journal pin. This results in increased chain wear, increased operating noise, and decreased smoothness of chain operation. To compensate for these factors, the chain load and speed of operation undesirably must be reduced.

Chain wear causes slow alterations of the chain dimensions. For this reason, sprocket wheels for use with chain drives generally are formed to receive chains thereon relatively loosely to assure proper engagement of the wheel with the chain in spite of dimensional inconsistencies. That is, chain rollers are relatively loosely seated between sprocket wheel teeth to permit some rocking and lateral movement. This type of sprocket wheel construction serves only to further increase chain wear as well as sprocket wheel wear to further reduce chain life.

The chain drive of the invention overcomes the disadvantages encountered in the prior art by providing an improved drive chain having a minimum number of moving parts and points of detrimental wear. Further, the drive chain of this invention provides a complementary-shaped sprocket wheel for use with the drive chain for snugly and matingly receiving said chain to further reduce chain and wheel wear, and thereby prolong the service life of the chain and the wheel.

SUMMARY OF THE INVENTION

In accordance with the invention, a drive chain is provided having a plurality of one-piece roller links. Each roller link has an enlarged diameter central roller bounded at opposed ends by a pair of angularly upwardly and outwardly projecting peripheral flanges. Each roller link also has a relatively small diameter journal extending outwardly from each flange in axial alignment with the central roller. Spring clips are provided for retaining the journals within self-lubricating bushings mounted on connecting side plates, with said side plates being mounted on the journals in an overlapping, staggered relationship to provide a continuous roller chain.

The drive chain with one-piece roller links is adapted for use with a complementary-shaped sprocket wheel having a plurality of sprocket teeth separated by radially recessed bottom lands. Importantly, these recessed lands together with the sprocket wheel side walls are shaped for mating engagement and seating with the central rollers and angular flanges of the roller links. The recessed lands of the sprocket wheel blend into flat sprocket tooth faces, or profiles. This allows the central rollers of the roller links to move from positions locked within their recessed lands out of and away from the sprocket wheel upon sufficient wheel rotation with substantially no rolling contact between the rollers and the sprocket tooth faces.

BRIEF DESCRIPTION OF THE DRAWINGS

The accompanying drawings illustrate the invention. In such drawings.

DETAILED DESCRIPTION OF THE PREFERRED EMBODIMENT

Figure 1:
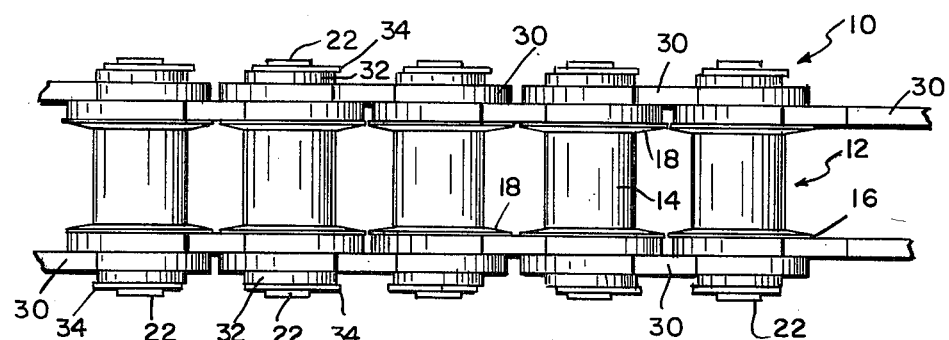
FIG. 1 is a fragmented plan view of a drive chain of this invention.
Figure 2:
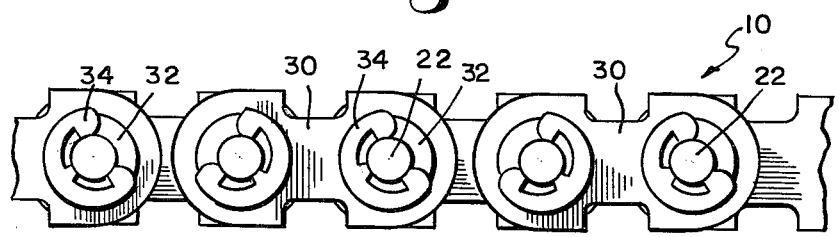
FIG. 2 is a fragmented elevation view of the drive chain shown in FIG. 1.
Figure 3:
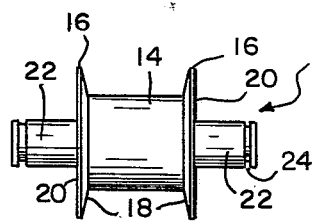
FIG. 3 is a side elevation view of a one-piece roller for the drive chain.
Figure 4:
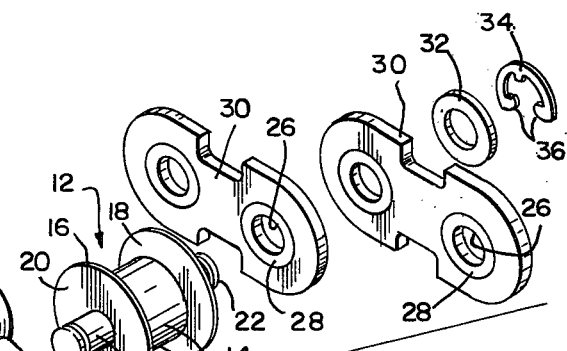
FIG. 4 is an exploded perspective view illustrating assembly of the drive chain of this invention.

The drive chain 10 of this invention is shown in FIGS. 1 through 4, and comprises a plurality of one-piece roller links 12 formed from steel or the like. The roller links 12 each have an enlarged diameter cylindrical central roller 14, or bearing surface, of circular cross section. The opposed ends of the central roller 14 blend integrally into peripheral flanges 16 having opposed inwardly directed faces 18 extending upwardly and angularly outwardly from the central roller 14 at an angle of from about 15° to about 30°. The outside faces 20 of the flanges 16 are flat, and are oriented normal to the longitudinal axis of the roller link.

Each roller link 12 has a pair of integrally-formed journals 22 projecting outwardly from the flange outside faces 20 in axial alignment with the cylindrical central roller 14. Each journal has a diameter substantially less than the diameter of the central roller 14, and has a circumferential groove 24 formed near the outer extent thereof. As shown best in FIG. 4, each journal 22 of each roller link 12 is snugly received through openings 26 formed in a pair of self-lubricating bushings 28 such as porous bronze bearings known as Oilite bearings which are press-fit into connecting side plates 30. Then, a washer 32 is received over each journal, and the two side plates 30 and washer 32 are retained in position by a generally U-shaped spring clip 34 having inwardly directed fingers 36 for reception in the groove 24.

The side plates 30 are carried on the roller link journals 22 in an overlapping, staggered fashion to interconnect the roller links to provide the continuous chain 10. Each of the side plates 30 is identical for ease of manufacture, and comprises a length of metal stock or the like having a pair of the self-lubricating bushings 28 press-fit therein. Each roller link 12 is connected to an adjacent roller link by a pair of the side plates 30 received over the journals 22 in direct abutting engagement with the flat outside faces 20 of the upstanding flanges 16. Then, each roller link 12 is connected to a second adjacent link in the chain by a second pair of side plates 30 received over the journals 22 in direct abutting contact between the first pair of side plates in engagement with the flanges 16, and the washers 32. Thus, the continuous chain 10 is provided with broad surface-to-surface contact between the side plates and the flanges, and with the journals 22 being non-rotatable with respect to the central rollers 14 and being received in the self-lubricating bushings 28 to minimize wear. If desired, the journals 22 can be heat-hardened to further decrease chain wear.

Figure 5:
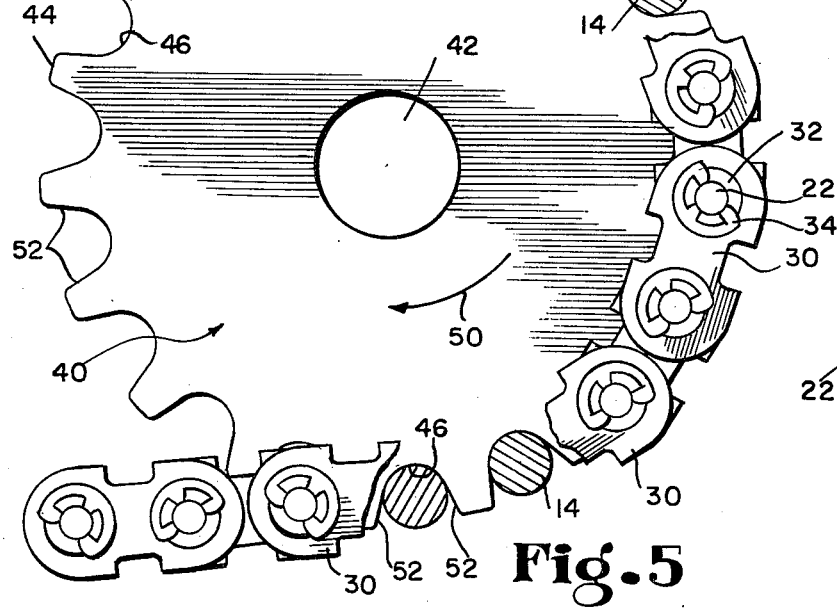
FIG. 5 is a fragmented elevation view showing the drive chain and sprocket wheel of this invention, with portions thereof broken away.
Figure 6:
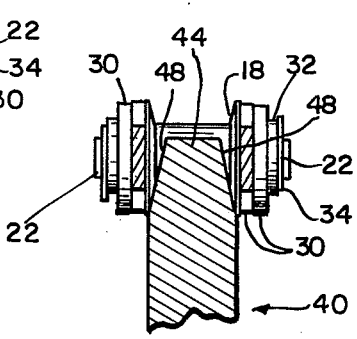
FIG. 6 is a fragmented section taken along lines 6—6 of FIG. 5.

The assembled drive chain 10 is trained about a complementary-shaped sprocket wheel 40, as shown in FIGS. 5 and 6. The sprocket wheel 40 comprises a generally circular wheel of steel or the like having a spindle 42 received through the center thereof for either rotatably driving or allowing rotation of the wheel. The sprocket wheel has a plurality of sprocket teeth 44 separated by recessed bottom lands 46. The recessed lands 46 each have a circular cross section closely corresponding to the circular cross section of the chain central rollers 14 over an arc of approximately 120° to assure a snug and locking seating of the rollers 14 between the wheel teeth 44. Further, as shown in FIG. 6, the sprocket wheel has axially inwardly tapered side walls 48 about the wheel periphery. Importantly, these side walls 48 are tapered at an angle of from about 15° to about 30° to correspond to the taper of the inwardly directed flange faces 18, and to provide a wheel width at the bottom lands 46 corresponding to the width of the central rollers 14. In this manner, engagement of the rollers 14 with the sprocket wheel 40 is smooth and accurate as the wheel is rotated, for example, in the direction of arrow 50. The rollers 14 and flanges 16 snugly and lockingly seat against the wheel side walls 48 and within the bottom lands 46, respectively, to substantially eliminate chain rocking or side-slip movement.

As shown in FIG. 5, the radially recessed bottom lands 46 between the sprocket teeth 44 blend into flat tooth faces 52, or tooth profiles. This allows the chain rollers 14 to be released from the sprocket wheel 40 with little or no sliding or rolling contact between the rollers and the teeth 44. That is, the rollers remain seated in the recessed lands 46 until they are pulled out of the lands by sprocket wheel rotation. When this occurs, the rollers 14 exit the lands with little or no tooth contact because of the non-existence of conventional involuted tooth profiles. Similarly, the rollers are engaged with the sprocket wheel in the same manner to substantially reduce wear between the chains 10 and the sprocket wheel 40 to thereby substantially reduce the hazard of chain breakage.

The chain drive of this invention provides a roller chain which is lockingly receivable about a sprocket wheel. More specifically, each of the rollers 14 of each roller link is snugly and lockingly receivable within one of the matingly-shaped bottom lands 46 of the sprocket wheel. Once seated, each roller 14 remains seated until forces thereon pull the roller 14 out of its associated land, as when the sprocket wheel rotates sufficiently to allow the chain to carry the roller away from the wheel. Importantly, this involves forces directed out of the bottom land, as opposed to forces directed against the sprocket teeth 44 or the lands 46. Therefore, in the event one roller is prematurely lifted from its seat within a bottom land, adjacent rollers are pulled against their associated sprocket teeth to lock the chain on the wheel. Accordingly, in the event of breakage of any portion of the chain, the rollers 14 remain lockingly received in their associated lands, and do not hazardously fly off the sprocket wheel.

I claim:

1. A drive chain comprising a plurality of one-piece roller links each having a cylindrical central roller with a generally circular cross section and a pair of journals extending outwardly from the opposed ends thereof and axially aligned with said central roller; a plurality of side plates each having a pair of journal-receiving holes provided therein, said side plates being mounted in an overlapping, staggered fashion on the journals of adjacent roller links to form the drive chain; and means for retaining said side plates on said journals.

2. A drive chain as set forth in claim 1 wherein the central roller of each of said roller links has a cross sectional diameter larger than the cross sectional diameter of the journals extending outwardly therefrom.

3. A drive chain as set forth in claim 1 wherein each of said one-piece roller links further comprises an upwardly extending peripheral flange at each of the opposed ends of said central roller.

4. A drive chain as set forth in claim 3 wherein said flanges on each of said roller links have axially inwardly presented faces extending angularly upwardly and outwardly from the opposed ends of said central roller.

5. A drive chain as set forth in claim 3 wherein said flanges on each of said roller links have axially inwardly presented faces extending upwardly and outwardly from the opposed ends of said central roller at an angle of from about 15° to about 30°.

6. A drive chain as set forth in claim 3 wherein said flanges on each of said roller links have axially inwardly presented faces extending angularly upwardly and outwardly from the opposed ends of said central roller, and axially outwardly presented faces disposed normal to the central roller axis.

7. A drive chain as set forth in claim 1 wherein each of said journals has a groove formed near its end opposite the central roller, and wherein said retaining means comprises a spring clip removably receivable in said groove.

8. A drive chain as set forth in claim 1 wherein each of the journal-receiving holes in each of said side plates has a self-lubricating bushing carried therein, said self-lubricating bushing having an opening formed therein for receiving one of said journals.

9. A drive chain and sprocket assembly comprising a plurality of one-piece roller links each having a central cylindrical roller with a circular cross section, a pair of peripheral flanges extending upwardly from the opposed ends of said central roller, and a pair of journals extending outwardly from the opposed ends of said central roller and axially aligned with said central roller, said journals each having a cross sectional diameter substantially less than the cross sectional diameter of said central roller; a plurality of side plates each having a pair of journal-receiving holes provided therein, said side plates being mounted in an overlapping, staggered fashion on the journals of adjacent roller links to form the chain; and means for retaining said side plates on said journals, said chain being trained about said sprocket.

10. The invention as set forth in claim 9 wherein said flanges on each of said roller links have axially inwardly presented faces extending angularly upwardly and outwardly from the opposed ends of said central roller, and said sprocket has its outer peripheral edges tapered to conform to said axially inwardly presented flange faces.

11. The invention as set forth in claim 9 wherein said flanges on each of said roller links have axially inwardly presented faces extending angularly upwardly and outwardly from the opposed ends of said central roller, and outwardly presented faces disposed normal to the central roller axis.

12. The invention as set forth in claim 9 wherein each of said journals has a groove formed near its end opposite the central roller, and wherein said retaining means comprises a spring clip removably receivable in said groove.

13. The invention as set forth in claim 9 wherein the journal-receiving holes in said side plates have self-lubricating bushings carried therein, said self-lubricating bushings having openings formed therein for receiving said journals.

14. The invention as set forth in claim 9 wherein said sprocket wheel comprises a plurality of radially outwardly extending sprocket teeth separated by recessed bottom lands, said bottom lands being circularly recessed over an arc of approximately 120° and having a cross section and width for mating reception of said central rollers.

15. A chain drive comprising, in combination, a chain formed from a plurality of one-piece roller links each having a generally cylindrical central roller and a pair of journals extending axially outwardly from the opposed ends thereof, a plurality of side plates each having a pair of journal-receiving holes provided therein, said side plates being mounted in an overlapping, staggered fashion on the journals of adjacent roller links to form the chain, and means for retaining said side plates on said journals; and a sprocket wheel for receiving the chain, said sprocket wheel having a plurality of radially outwardly projecting sprocket teeth separated by bottom lands, said bottom lands each having an axial width corresponding to the axial width of said central rollers and being arcuately recessed for mating reception of said central rollers, said arcuate bottom lands blending into flat sprocket tooth faces to form flat tooth profiles.

16. A chain drive as set forth in claim 15 wherein each of said roller links further comprises peripheral flanges projecting upwardly from the opposed ends of said central roller, said flanges having axially inwardly presented faces extending angularly upwardly and outwardly from the opposed ends of said central roller; and said sprocket wheel further comprises axially inwardly tapering peripheral side walls corresponding angularly to the inwardly presented flange faces on said roller links whereby said inwardly presented flange faces matingly engage said tapered wheel side walls when the chain is received on said wheel.

17. A chain drive as set forth in claim 16 wherein said inwardly presented flange faces and said inwardly tapering wheel side walls are each formed at an angle of from about 15° to about 30°.

18. A chain drive as set forth in claim 15 wherein said bottom lands have a circularly recessed cross section through an arc of approximately 120°.

19. A chain drive comprising, in combination, a chain formed from a plurality of one-piece roller links each having a central roller, peripheral flanges extending upwardly from the opposed ends of said central roller, said flanges each having an axially inwardly presented face extending angularly upwardly and axially outwardly from the associated roller end and an outwardly presented face disposed normal to the roller axis, and a pair of journals extending axially outwardly from the opposed ends of said central roller, said journals having a cross sectional diameter substantially less than the cross sectional diameter of said central roller, a plurality of side plates each having a pair of journal-receiving holes provided therein, said side plates being mounted in an overlapping, staggered fashion on the journals of adjacent roller links to form the chain, and means for retaining said side plates on said journals, and a sprocket wheel for receiving the chain having a plurality of outwardly projecting sprocket teeth separated by bottom lands, said bottom lands each having an axial width corresponding to the axial width of said central rollers and being arcuately recessed for mating reception of said central rollers, said arcuate bottom lands blending into flat sprocket tooth faces to form flat tooth profiles, and said wheel having inwardly tapering peripheral side walls corresponding angularly to the inwardly presented flange faces on said roller links whereby said inwardly presented flange faces matingly engage said tapered wheel side walls when the chain is received on said wheel.

* * * * *